United States Patent [19]

Roger

[11] 4,188,974
[45] Feb. 19, 1980

[54] BYPASS VALVE ASSEMBLY AND SYSTEM

[76] Inventor: Harry Roger, 124 Banks Ave., Lafayette, La. 70506

[21] Appl. No.: 894,415

[22] Filed: Apr. 7, 1978

Related U.S. Application Data

[63] Continuation-in-part of Ser. No. 734,603, Oct. 21, 1976, abandoned.

[51] Int. Cl.$^2$ ............................................. F16K 11/07
[52] U.S. Cl. .................................. 137/557; 137/625.4; 137/597; 137/625.48
[58] Field of Search ............... 137/557, 625.69, 625.48, 137/597, 625.4

[56] References Cited

U.S. PATENT DOCUMENTS

| | | | |
|---|---|---|---|
| 2,517,061 | 8/1950 | Von Stockelberg | 137/625.48 X |
| 2,524,142 | 10/1950 | Seeloff | 137/625.48 X |
| 2,633,324 | 3/1953 | Bierman | 137/625.48 |
| 3,134,401 | 5/1964 | Kelly | 137/557 |
| 3,272,230 | 9/1966 | Bolling | 137/557 |
| 3,511,273 | 5/1970 | Bartholomaus | 137/557 |
| 3,580,284 | 4/1969 | Bini | 137/625.18 |

*Primary Examiner*—Alan Cohan

[57] ABSTRACT

A valve assembly comprises a valve body having a hollow and a valve element longitudinally movable between first and second positions therein. The valve assembly has at least one inlet and at least one outlet in pressure communicating relation to the hollow. The valve element in its first position blocks pressure communication between the inlet and the outlet. In its second position, the valve element permits pressure communication between the inlet and the outlet. A pressure sensitive indicator is operatively associated with the valve element. The assembly provides pressure communication between the inlet and the indicator when the valve element is in one of its positions and blocks such pressure communication in the other position. The assembly may also include other inlets and outlets, and the high pressure inlets are preferably longer than the respective controlling seals. Thus the seals need not cross the inlets to control flow therethrough. The bypass valve assembly can be incorporated in a system for monitoring pressure within a fluid flow-line and selectively controlling fluid flow in that line and in a method for testing the controlling apparatus without interruption of flow in the line being monitored.

17 Claims, 12 Drawing Figures

PRIOR ART

BYPASS VALVE ASSEMBLY AND SYSTEM

CROSS-REFERENCE TO RELATED APPLICATION

This application is a continuation-in-part of my prior co-pending U.S. Application Ser. No. 734,603, filed Oct. 21, 1976 now abandoned.

BACKGROUND OF THE INVENTION

1. Field of the Invention

The present invention pertains to a bypass valve assembly which, while adaptable for various purposes, is especially useful in testing systems for monitoring the pressure in a fluid flow-line and closing off such fluid flow-line upon detection of pressures of predetermined values. Too great a pressure drop in such a flow-line might indicate a break in the line, while a substantial increase in pressure generally indicates some type of obstruction. In either case, the flow in the line should be cut off until appropriate corrective measures can be taken.

Accordingly, such a system typically comprises two pressure control units communicating with the flow-line. A shut off valve in the flow-line is maintained in open position by the communication of fluid pressure to its actuator through a signal line. The signal line passes through both control units. If the pressure becomes too great in the flow-line, this will be detected by one of the units which will close the signal line. This in turn will cause the actuator to close the shut off valve. Similarly, if the pressure becomes too low, the other unit will close the signal line and thus cause the shut off valve to be closed.

2. Description of the Prior Art

In connection with systems of the type described above, it is necessary periodically to test the control units to be sure that they are operating properly. This necessitates blocking the control units from communication with the pressure in the flow-line and applying a known test pressure to the control units. However, it is not desirable to have the control units close the signal line thereby causing closing of the shut off valve in response to the test pressure. Therefore, a bypass line, not controlled by the control units, is provided for supplying fluid pressure to the shut off valve actuator during the testing procedure.

In conventional systems, such test procedures require the operation of three separate valves: one to block the communication between the control units and the flow-line, one to admit the test pressure to the control units, and one to open the by-pass line to the shut off valve actuator. Since these valves are usually not located near one another, the procedure generally requires two workers or necessitates several trips back and forth between the valve locations on the part of one worker. Furthermore, regardless of the location of the valves, there is always the danger that, once the testing is completed, the worker will forget to disconnect the bypass line and re-connect the signal line. Thus, although the control units may be working properly, they will not effect closing of the shut off valve since fluid pressure will be continuously supplied to its actuator through the bypass line. Thus, the purpose of the monitoring system is frustrated.

SUMMARY OF THE INVENTION

The present invention provides a double three-way bypass valve assembly including a valve body having a hollow therein and a movable assembly longitudinally movable with respect thereto between first and second positions. The valve assembly has first, second, third, and fourth inlets and first and second outlets in pressure communicating relation to the hollow in the valve body. The movable assembly includes a valve element which, in its first position, permits pressure communication between the first inlet and the first outlet via the hollow, permits pressure communication between the third inlet and the second outlet via the hollow, and blocks each of the second and fourth inlets from pressure communication with either of the outlets. In its second position, the valve element permits pressure communication between the second inlet and the first outlet via the hollow, permits pressure communication between the fourth inlet and the second outlet via the hollow, and blocks each of the first and third inlets from pressure communication with either of the outlets.

The valve is incorporated in a system of the type generally described above by connecting the first inlet to the flow-line, the second inlet to the test pressure source, the first outlet to the control units, the third inlet to the signal line, the fourth inlet to the bypass line, and the second outlet to the shut off valve actuator. Thus, when the valve element is moved from its first position to its second position, the flow-line is blocked from communication with the control units. Such movement also automatically disconnects the shut off valve actuator from the signal line and connects it to the bypass line. When the valve is returned to its second position, each of the above procedures is reversed.

Thus the various connections and disconnections necessary for the test procedure may easily be made by one worker. Furthermore, it is impossible for the worker to omit one of a series of connections and disconnections, e.g. to forget to disconnect the bypass line from the shut off valve actuator when the control units are re-connected with the flow-line after testing.

In the preferred forms of the invention, the bypass valve assembly is a spool-type valve. Each of the inlets and outlets is not only in pressure communicating relation but also in actual fluid communicating relation to the hollow in the valve body, and both the hollow and the valve element are elongate. The valve element is slidably mounted in the hollow for longitudinal reciprocation between the first and second positions.

In one embodiment the valve element has seal means movable generally across respective ones of the outlets, to accomplish the various connections and disconnections described above. These seals are arranged so that the bypass line is connected to the shut off valve actuator prior to or simultaneously with the blocking of the signal line from the shut off valve actuator. Also, the arrangement of the seal means causes the blocking of the signal line from the shut off valve actuator and the blocking of the flow-line from the control units to occur substantially simultaneously. Finally, the seal associated with the first outlet and the control units is designed to ensure that the test pressure is not permitted communication with the control units before the latter are blocked from communication with the flow-line, i.e., so that the test pressure source is not exposed to the flow-line pressure.

In another embodiment of the invention, the valve is provided with a pressure sensitive indicator operatively associated with the valve element. The indicator is operative upon communication therewith of pressure greater than or equal to a given magnitude to provide a first indication, and upon communication therewith of pressure less than such magnitude, to provide a second indication. The valve assembly further includes means providing pressure communication between one of the valve inlets and the indicator when the valve is in one of its two positions, and means blocking pressure communication between that inlet and the indicator when the valve is in the other of its two positions. Thus, this form of the invention further ensures against mistakes by the attendants, such as failure to return the system to its normal operating condition after running a test, by providing a readily apparent indication of the valve position, and thus of the condition of the overall system in which the valve is employed.

In a preferred form of this latter embodiment, the indicator is adjoined to the valve element externally of the valve body and the valve element has a passageway extending radially thereinto and another passageway extending longitudinally from an inner portion of the radial passageway to the indicator. An indicator vent extends generally radially into the valve body to the hollow in longitudinally spaced relation to the fourth inlet, i.e. the bypass inlet. The valve element further has seal means disposed on opposite sides of the aforementioned radial passageway. As explained above, when the valve element is in its first position, the fourth inlet is blocked from pressure communication with either of the valve outlets. However, the passageway and indicator seals of the valve assembly, are disposed so that the radial passageway communicates with the fourth inlet in the first position. Thus, the bypass pressure is communicated to the indicator to provide a first indication showing that the system is in its normal or in service position. When the valve element is moved to its second position for testing of the system, the radial passageway of the valve element is moved into alignment with the indicator vent and blocked from communication with the fourth or bypass inlet, the latter now being in communication with one of the valve outlets. Thus, a lower pressure is communicated to the indicator which produces a second indication showing that the valve and system are in the testing condition.

The second embodiment of the invention is also adapted to accommodate extremely high pressure without the need for undue multiplicity of parts and/or a high degree of mechanical complexity. In particular, such valve assembly has at least two of its inlets defined by longitudinally spaced apart bores extending generally laterally into the valve body to the hollow. One of the valve outlets is similarly defined by a bore extending generally laterally into the valve body to the hollow intermediate said two inlets. These two inlets may be the first inlet, which in the system of the invention is communicated with the control pressure, and the second inlet, which is communicated with the test pressure. The intermediate outlet would then be the outlet communicating with the control units. The valve element in this embodiment does not operate by moving seals across the inlets or outlet. Rather, a first seal is disposed in alignment with the first inlet in the first position and intermediate the first inlet and the first outlet in the second position of the valve element. Similarly, a second seal is disposed intermediate the first outlet and the second inlet in the first position of the valve element but aligned with the second inlet in the second position. Each of these two inlets is substantially greater in longitudinal extent than its respective seal. Thus, when either of these two seals is in alignment with its respective inlet, fluid may flow through said inlet to the intermediate outlet. Accordingly, the first outlet can be selectively communicated with either of the first or second inlets without the need for any seal to cross either said outlet or said inlets. This in turn permits a relatively soft, simple, and inexpensive type of seal (such as ordinary elastomeric O-ring) to be used without the danger of such seal being cut or otherwise damaged as it would be if it were necessary for the seal to pass completely across a high pressure port. This feature is of importance since a relatively soft elastomeric seal, such as an O-ring, is, aside from its susceptibility to damage, a highly effective and desirable type seal. Thus, by eliminating the primary cause of damage to such seals in spool-type valves, the present invention permits the use of the preferred seal material even where the respective inlet pressures are on the order of 5,000 psi or more.

Accordingly, it is a principal object of the present invention to provide a novel double three-way valve assembly.

Another object of the invention is to provide a spool-type valve assembly for disconnecting two inlets from respective outlets and connecting two other inlets to respective ones of the outlets in a single motion.

Still another object of the invention is to provide an improved system for monitoring pressure in a fluid flowline and selectively controlling fluid flow within the flowline in accord with said pressure, which is equipped with improved means for periodically testing the control means of the system.

A further object of the invention is to provide an improved double three-way spool-type valve designed to effect its various connections and disconnections in predetermined chronological relation to one another.

Yet another object of the invention is to provide an improved method of testing the control means of a pressure monitoring system.

Another object of the invention is to provide a spool valve assembly comprising pressure responsive indicator means.

Still a further object of the invention is to provide a three-way spool valve permitting selective communication of an outlet with either of two inlets without the need for seal means crossing either the outlet or the inlets.

Still other objects, features and advantages of the present invention will be made apparent by the following description of the preferred embodiments, the drawings and the claims.

DESCRIPTION OF THE PREFERRED EMBODIMENTS

Figure 1:
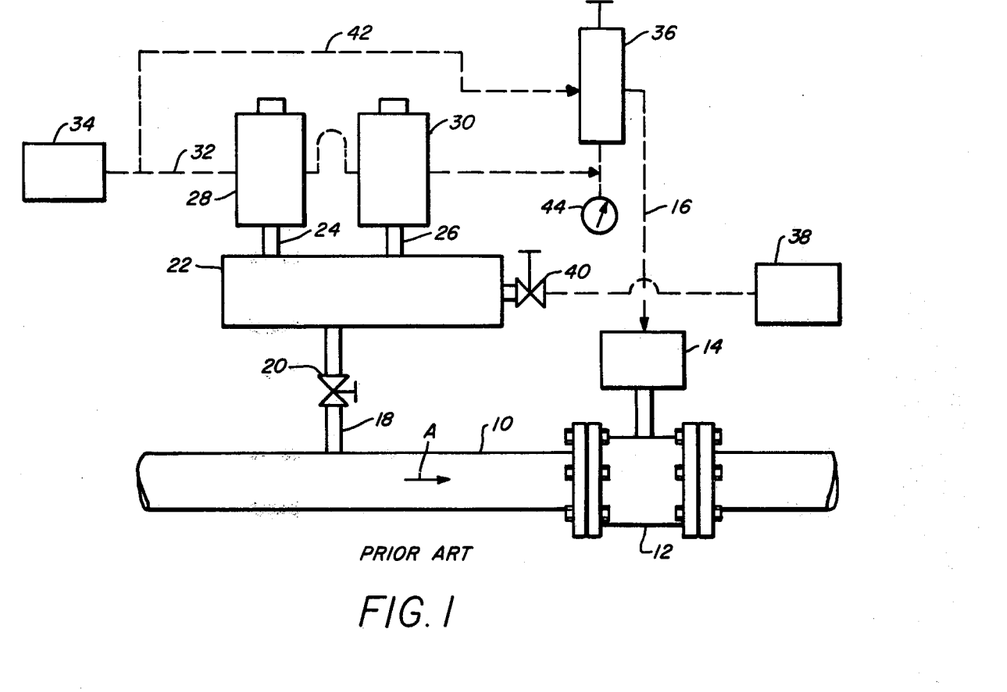
FIG. 1 is a flow diagram of a prior art system of the type to which the present invention may be applied.

Referring now to the drawings, FIG. 1 represents a prior art monitoring system of the general type to which the present invention can be applied to improve the system. The system includes a flow-line 10 through which a fluid, such as natural gas, flows in the direction of arrow A. A shut off valve 12 is connected in line 10 for opening and closing the line. Valve 12 has an actuator 14 of a well known type which is activated by the communication of fluid pressure thereto. If fluid pressure is communicated to the actuator 14 through line 16, the valve 12 is held open. If fluid pressure is cut off from actuator 14, valve 12 will close.

A pressure tap 18 having a manually operable valve 20 therein communicates with the line 10 upstream of the shut off valve 12 and also with a fitting 22 having outlet lines 24 and 26. Control units 28 and 30 are connected to respective ones of the outlet lines 24 and 26 so that the control units each receive gas pressure from line 10 through tap 18 and fitting 22. A signal line 32 connected to a source 34 of fluid pressure passes through both of the control units 28 and 30 and thence through a valve 36 to the line 16 to the valve actuator 14.

If there should be a leak or break in line 10 or an obstruction upstream of tap 18, the pressure in the line will drop below a predetermined value. Such pressure drop is detected by the control unit 28 which closes line 32. This cuts off fluid pressure communication to valve actuator 14 through line 16, and valve 12 is thus closed to prevent dangerous leakage of gas or explosion. If there is some obstruction in the line 10 downstream of tap 18, the pressure in the line will rise above another predetermined value. This rise will be detected by the control unit 30 which will close line 32 resulting in the closing of valve 12 by actuator 14. Control units 28 and 30 may be of a well known type such as that shown in U.S. Pat. No. 3,043,331 to Peters.

In the use of the system of FIG. 1, it is periodically necessary to test the control units 28 and 30 to ascertain that they are responding properly to pressure variations. Accordingly, the valve 20 is closed, and a source 38 of known selectively variable pressure is placed in communication with the fitting 22 by opening a valve 40. However, it is not desirable that the communication of fluid pressure to actuator 14 be cut off by the control units 28 and 30 during this testing procedure. Thus, prior to the opening of valve 40 and closing of valve 20, valve 36 is operated to disconnect line 32 from line 16 and connect line 16 to a bypass line 42 which is connected to the same pressure source 34 as the line 32 but which does not pass through the control units 28 and 30. Thus the valve 12 will be held open during the testing procedure.

The test pressure applied to the fitting 22 through valve 40 may now be raised and lowered to the predetermined limits at which the control units 28 and 30 are to close the line 32. The fact that the units 28 and 30 do in fact close line 32 at the proper pressures can be determined by observing the meter 44 connected to line 32 downstream of the control units. If it is determined that the units 28 and 30 are not functioning properly, suitable adjustments can be made. To place the system back in normal service, the test pressure must be blocked from the fitting 22 by closing valve 40, the pressure from line 10 must once again be communicated to the fitting 22 by opening valve 20, and the bypass line must be disconnected from line 16 and the signal line 32 reconnected to line 16 by the valve 36. This is a three step procedure requiring at least two workers or, if performed by one worker, a relatively large time gap between the operation of the various valves. Furthermore, there is always the danger that the operator will operate valves 20 and 40 but forget to operate valve 36, in which case the subsequent operations of control units 28 and 30 will be ineffective in opening and closing the shut off valve 12.

Figure 2:
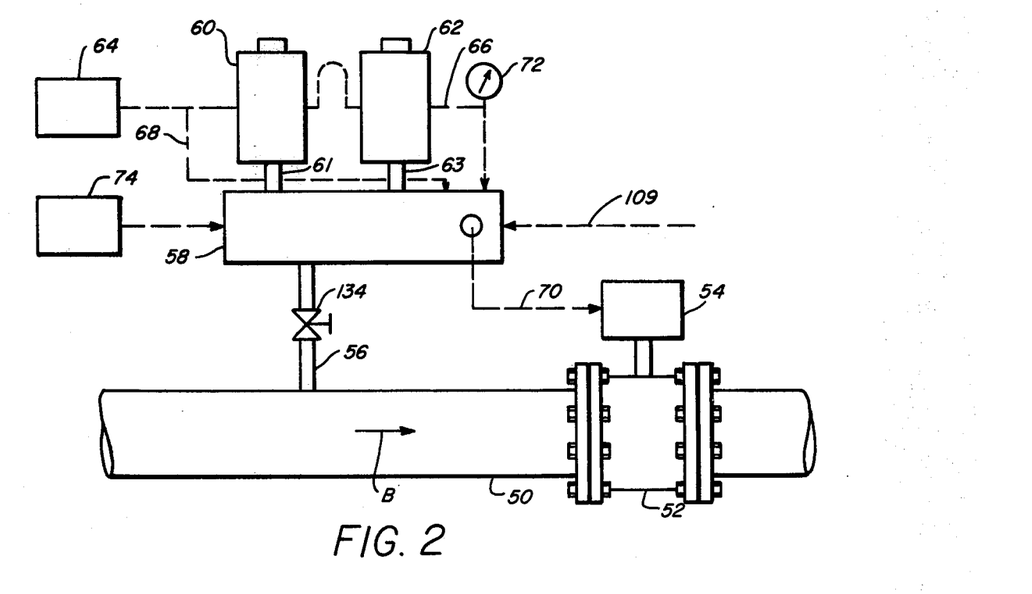
FIG. 2 is a diagram similar to that of FIG. 1 illustrating the system of the present invention.

Referring now to FIG. 2, there is shown a system similar to that of FIG. 1 but incorporating the present invention. The system of FIG. 2 includes a fluid flow-line 50 in which a fluid such as natural gas flows in the direction of arrow B. A shut off valve 52, substantially identical to valve 12 of FIG. 1, is connected in the line 50 and has a valve actuator 54 substantially identical to actuator 14 of FIG. 1. A pressure tap 56 communicates with line 50 upstream of valve 52 and is connected to the bypass valve assembly 58 of the present invention.

A pair of control units 60 and 62, substantially identical to units 28 and 30 respectively of FIG. 1 are each connected to valve assembly 58 by respective lines 61 and 63. A fluid pressure source 64 is provided and has two lines 66 and 68 extending therefrom and connected to the valve assembly 58. Line 66 is the signal line and passes through both control units 60 and 62 for opening and closing by the control units as described above. Line 66 also communicates with a meter 72 for use during testing procedures. Line 68 is a bypass line leading directly from the pressure source 64 to the valve assembly 58 without passing through the control units. A line 70 connected to the valve assembly 58 leads to the shut off valve actuator 54. A source 74 of test pressure is provided and is connected or connectable with the valve assembly 58 in a manner to be described more fully below.

Figure 3:
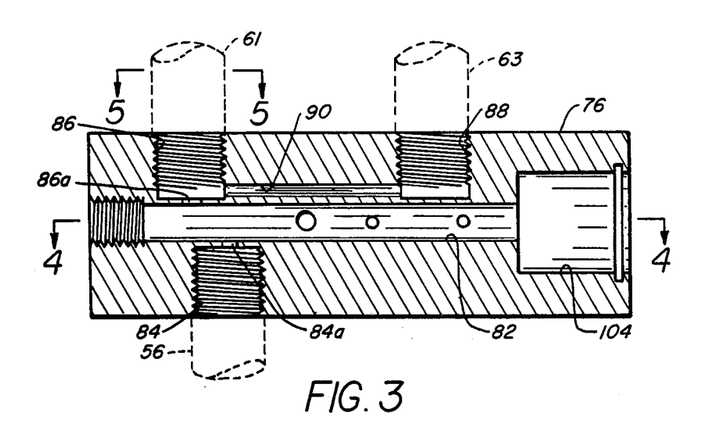
FIG. 3 is a longitudinal sectional view of the valve body of the bypass valve assembly of FIG. 2.
Figure 4:
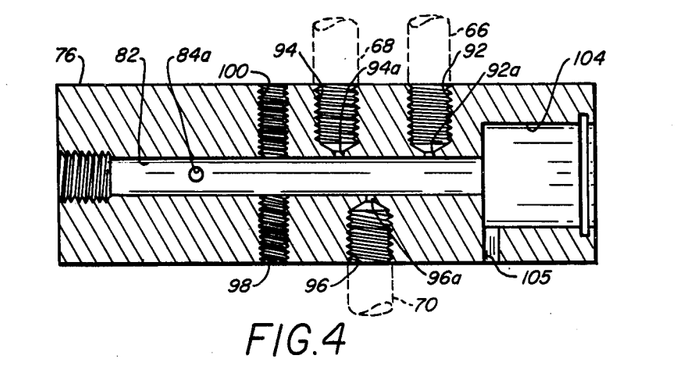
FIG. 4 is a longitudinal sectional view of the valve body taken on lines 4—4 of FIG. 3.

Referring now to FIGS. 3–6, the valve assembly includes a valve body or housing 76 and a movable assembly comprising a valve element 78 and a stinger 80. The valve element 78 is comprised of a rigid shaft portion surrounded by a plurality of seal rings described more fully below. Referring to FIGS. 3 and 4, the valve body 76 has a hollow therein in the form of a central longitudinal bore 82 therethrough. (As used herein, terms such as "longitudinal," "radial," and "circumferential" should be construed with respect to the valve body unless otherwise noted.) A number of radial bores through the valve body 76 communicate with the longitudinal bore 82. In particular, a threaded radial bore 84 has a reduced diameter portion 84a defining a first inlet in communication with bore 82. Pressure tap 56 is connected to inlet 84a by a threaded connection to the large diameter outer portion of bore 84. Another threaded radial bore 86 has a reduced diameter portion 86a defining a first outlet in communication with bore 82. Line 61 is connected to outlet 86a by a threaded connection with the outer portion of bore 86. A threaded bore 88 generally parallel to bore 86 extends radially into the valve body 76 but not into the bore 82. Bore 88 communicates with bore 86 by means of an off-center longitudinal bore 90, and line 63 is threadedly connected to bore 88.

In a plane perpendicular to that of the centerlines of bores 84, 86 and 88, valve body 76 has three radial bores 92, 94 and 96 having reduced diameter portions 92a, 94a and 96a respectively communicating with bore 82. Portion 92a of bore 92 defines a third inlet,; portion 94a of bore 94 defines a fourth inlet; a protion 96a of bore 96 defines a second outlet of the valve assembly. Signal line 66 is connected to third inlet 92a by a threaded connection to bore 92. Bypass line 68 is similarly connected to inlet 94a by threading into bore 94, and line 70 is connected to outlet 96a in like manner. Valve body 76 also has diametrically opposed threaded radial bores 98 and 100 therein for purposes to be described hereafter.

Figure 6:
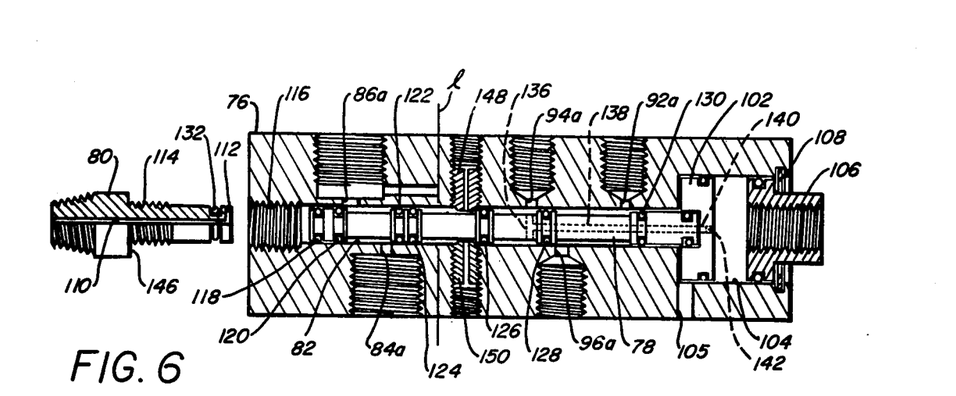
FIG. 6 is a longitudinal sectional view of the entire valve assembly with the portion to the right of line 1 in the plane of FIG. 4, the portion to the left of line 1 in the plane of FIG. 3, and parts being shown in elevation.

Referring now to FIG. 6, the portions of the valve body to the left and right of line 1 are shown in different planes so that all inlets and outlets can be seen. The movable assembly comprising valve element 78 and stinger 80 is longitudinally movable in the bore 82 between first and second positions. As shown in FIG. 6, the valve element 78 is in its first or normal operating position. A piston 102 is affixed to the right end of valve element 78 in any suitable manner and is received in a large diameter portion 104 of the bore 82 which serves as a cylinder. A fitting 106 extends through the valve body 76 into cylinder 104 and is retained therein by a snap ring 108. Fitting 106 has a central flowway and is connected to a conduit 109 (see FIG. 2) for delivering pressurized gas to cylinder 104 on the right side of piston 102. Thus piston 102 and the connected valve element 78 are normally biased into their far left position as shown in FIG. 6, i.e. into their first position. Cylinder 104 has a vent opening 105 at its left end to prevent locking of the piston and valve element.

Stinger 80 has a fluid passageway therethrough comprising a longitudinal passage 110 communicating with a radial slit 112 at the right end of the stinger. When the stinger 80 is inserted into the left end of bore 82, the slit 112 is in communication with the bore 82 and serves as a second inlet for the valve assembly. The source 74 of test pressure is connected to stinger 80 in communication with passage 110 by a conduit or the like. Stinger 80 and bore 82 have mating threaded sections 114 and 116. Thus the stinger 80 may be threaded into bore 82 to introduce the test pressure to bore 82. As the stinger 80 is threaded into bore 82, it will come into abutment with the valve element 78. At this point, the entire movable assembly is said to be in its first position. Then by continued threading of stinger 80 into bore 82, the movable assembly is urged to the right against the force of the gas in cylinder 104 to its second position shown in FIG. 8 where it is stopped by engagement of a shoulder 146 on stinger 80 with the outside of the valve body 76. When the stinger 80 is retracted, the gas in cylinder 104 to the right of piston 102 will urge the remainder of the movable assembly to the left back into its first position where it is stopped by engagement of piston 102 with the left end of cylinder 104.

Valve element 78 has a plurality of O-ring seals 118, 120, 122, 124, 126, 128 and 130 spaced along its length. Each of these seals is located between a respective pair of opposed annular shoulders formed by radial flanges on the shaft portion of the valve element and is sized to seal between the shaft portion of the valve element and the valve body within the bore 82.

As seen in FIG. 6, when the valve element 78 is in its first position, the first inlet 84a is in fluid communication with the first outlet 86a via an annular space in bore 82 defined between the shaft portion of the valve element 78 and the valve body 76 and between seals 118 and 120 on the left and seals 122 and 124 on the right. If the stinger 80 is threaded into bore 82 until it reaches its first position in abutment with valve element 78, the second inlet 112 will be disposed to the left of seals 118 and 120 and will thus be blocked from communication with outlet 86a, as well as the other inlets and outlet, by these seals. It can also be seen that the third inlet 92a is permitted communication with outlet 96a via an annular space in bore 82 between seals 128 and 130. However fourth inlet 94a is blocked from communication with outlet 96a by seal 128 and from communication with outlet 86a and inlets 84a and 122 by seal 126. Thus, the pressure tap 56 is in communication with each of the control units 60 and 62, the test pressure is blocked from communication with the control units, the signal line 66 is in communication with the shut off valve actuator 54, and the bypass line 68 is blocked from the shut off valve actuator.

Seals 118 and 120 cooperate to serve as a first seal means movable generally across first outlet 86a between the first and second positions of the valve element 78. By this is meant that, in the first or left position, at least one of the seals 118 and 120 is sealingly engaging the valve body on the left of the outlet 86a, and in the second or right position, at least one of the seals 118 and 120 is engaging the valve body on the right of outlet 86a. Thus the first seal means 118, 120 as a whole may be said to move generally across the outlet even though one or both of the individual seal rings may not move entirely across the outlet.

Figure 8:
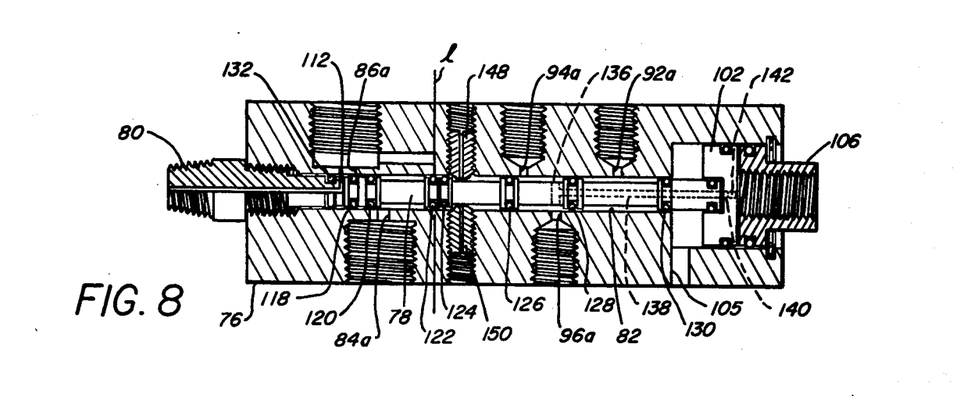
FIG. 8 is a view similar to those of FIGS. 6 and 7 showing the parts in still another position.

It can also be seen that, even though inlet 112 is a movable inlet and inlet 84a is fixed, the limits of movement of the movable assembly 78, 80 between its first and second position are such that inlets 84a and 112 will always be longitudinally spaced and seal means 118, 120 will always be disposed therebetween. Thus when seal means 118, 120 move across outlet 86a from first to second position, communication between inlet 84a and outlet 86a will be blocked by seal 120 and communication between inlet 112 and outlet 86a via bore 82 will be permitted as shown by FIG. 8. Similarly, when the valve element moves from first to second position, seal 128, which serves as the second seal means of the valve element, moves across outlet 96a to block communication between the outlet and inlet 92a and permit communication between the outlet and inlet 94a through an annular space between seals 126 and 128. As can be seen by comparison of FIG. 8 and 2, the second position of the valve element admits the test pressure to the control units 60 and 62 while blocking the latter from the pressure of the tap 56. Additionally, the second position of the valve element 78 connects the bypass line 68 with the shut off valve actuator 54 while blocking the signal line 66 from the shut off valve actuator.

Figure 7:
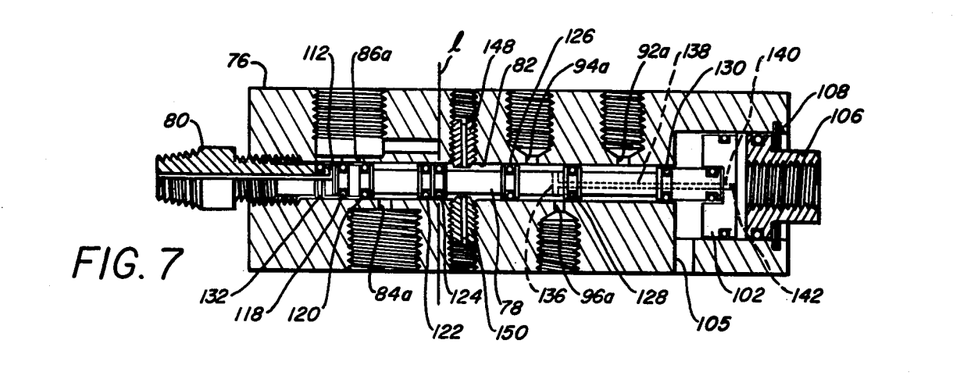
FIG. 7 is a view similar to that of FIG. 6 showing the parts in another position.

FIG. 7 shows the valve assembly in an intermediate position during the movement of the movable assembly from the first position of FIG. 6 to the second position of FIG. 8. By comparison of FIGS. 6–8, a number of features of the invention can be observed. Seal 130 at all times seals the inlets 92a, 94a and the outlet 96a from the cylinder 104 thus preventing the signal and/or bypass pressures from interfering with the operation of piston 102 and also preventing the pressure in cylinder 104 from interfering with the proper functioning of the shut off valve actuator 54. However, as an additional precaution and to simplify the system, the source of pressure to line 109 and cylinder 104 may be the same as the source 64 of signal pressure.

An O-ring carried on the exterior of the stinger 80 prevents leakage of test pressure fluid from bore 82.

When the valve element 78 is in the first position of FIG. 6, the distance from seal 120 to the right side of outlet 86a is substantially the same as the distance from seal 128 to the right side of outlet 96a. Then as the valve element 78 is moved to the right toward its second position, seals 120 and 128 attain sealing engagement with the valve body 76 on the right sides of their respective outlets at substantially the same time. Therefore blocking of the pressure tap 56 from the control units is substantially simultaneous with blocking of the signal line 66 from the shut off valve actuator. FIG. 7 shows the assembly just after the seals 120 and 128 have attained sealing engagement on the right sides of their respective outlets.

The effective sealing area of seal 128 is slightly smaller in longitudinal extent than that of the outlet 96a across which it moves. Thus the pressure from the bypass line 68 will begin to communicate with the outlet 96a before, or at least simultaneously with, the blocking of the signal line 66 from the outlet 96a and the blocking of the pressure tap 56 from the control units. This prevents any temporary cut off of pressure to the shut off valve actuator. Such temporary cut off is similarly prevented when the valve element 78 moves from its second position back to its first position.

While a temporary simultaneous communication of inlets 92a and 94a with outlet 96a as described above is desirable, simultaneous communication of inlets 84a and 112 with outlet 86a is both unnecessary and undesirable. This is because inlets 92a and 94a are connected to a common source of pressure, while the pressures at inlets 84a and 112 may differ. Thus communication of the latter two inlets with the same outlet, and thus with each other, may cause pressure backups and malfunctioning of the system.

Accordingly, seal 118 is spaced from seal 120 by a distance such that, when the valve element 78 is moved to the right from its first position and seal 118 releases its sealing engagement with the valve body 76 on the left of outlet 86a by passing into alignment with outlet 86a, seal 120 will already have attained sealing engagement with the valve body 76 on the right of outlet 86a. FIG. 7 shows the valve element 78 just after seal 118 has disengaged from the valve body on the left side of the outlet. When the valve element 78 is moved from its second position back to its first position, seal 118 will similarly be in sealing engagement with the valve body 76 on the left of outlet 86a when the seal 120 disengages from the valve body 76 at the right side of the outlet. Thus communication between the inlets 112 and 84a is prevented during operation of the valve assembly.

Metal plugs 148 and 150 having small vent orifices therethrough are threaded into bores 98 and 100 to prevent locking of the valve element. The plugs 148 may also serve to limit movement of valve element 78.

Figure 5:
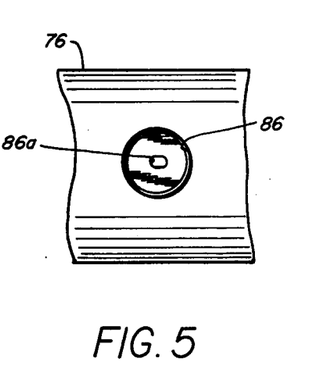
FIG. 5 is a fragmentary view taken on lines 5—5 of FIG. 3.

FIG. 5 shows the configuration of outlet 86a as viewed transversely. It can be seen that the longitudinal extent of the outlet 86a (with reference to the valve assembly rather than the outlet itself) is greater than that of either of the seal rings 118 and 120. This prevents the rings from being damaged as they pass over the edges of the outlet under pressure.

Figure 9:
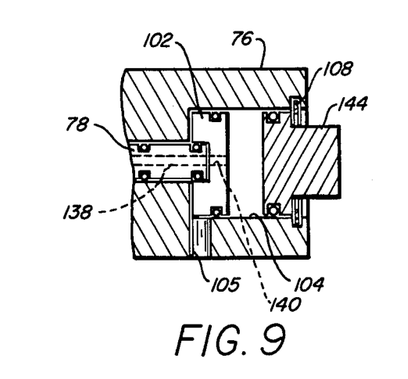
FIG. 9 is a fragmentary view of a modification of the valve assembly of FIGS. 3–8.

The valve assembly 58 is adaptable to two different ways of providing gas pressure to the cylinder 104 on the right side of piston 102. As explained above, with the valve assembly in the form shown in FIGS. 6–8, the gas pressure is supplied from an external source through a fitting 106. It can be seen that the shaft portion of the valve element 78 and the piston 102 have a system of gas ducts therethrough. These include a duct 136 extending diametrically through the valve element, a duct 138 extending longitudinally from duct 136 through the right end of the valve element, and a duct 140 extending longitudinally through piston 102 from duct 138 to the chamber 104 on the right side of the piston 102. Duct 140 is blocked by a plug 142. In FIG. 9, the plug 142 has been removed and fitting 106 has been replaced by a plug 144. Duct 136 is located between seals 126 and 128, and, by comparing FIGS. 6–8, it can be seen that in this location, the duct 136 is always exposed to pressure from inlet 94a regardless of the position of the valve. Thus, where the fluid flowing through inlet 94a is a gas, as is usually the case, it will enter the cylinder 104 and bias the movable assembly toward the left, i.e. toward its first position. The assembly is usually used in the form shown in FIGS. 6–8 where a relatively high gas pressure value is needed to bias the movable assembly, and in the form of FIG. 9 where a relatively low gas pressure value will suffice.

Referring again to FIG. 2 together with FIGS. 6–8, it can be seen that testing of the control units 60 and 62 can be accomplished as follows. First the stinger 80 is threaded completely into the bore 82 of the valve body 76. Thus the entire movable assembly of the valve is moved from its first to its second position by the single act of threading the stinger into the valve body. This accomplishes disconnection of the pressure tap 56 from the control units 60 and 62, disconnection of the signal line 66 from the shut off valve actuator 54, and connection of the bypass line 68 to the shut off valve actuator 54, all substantially simultaneously followed immediately by connection of the test pressure source 74 to the control units 60 and 62.

The pressure from source 74 can then be varied as needed to test the control units, the functioning of the latter being observed by means of the meter 72. Any needed adjustments to the control units may be made and the units retested if necessary. This may be repeated several times until it is determined that the control units are functioning properly.

The system is then put back into normal operation by the single act of removing the stinger from the valve body 76. Accordingly, the test pressure source 74 is disconnected from the control units 60 and 62, and, shortly thereafter, the pressure tap 56 is reconnected to the control units, the bypass line is disconnected from the valve actuator, and the signal line is reconnected to the valve actuator, all substantially simultaneously.

It can thus be seen that the bypass valve assembly 58 prevents accidental connection of the pressure tap to the control units without disconnection of the bypass line and reconnection of the signal line to the shut off valve actuator and other similar mistakes. A valve 134 may be provided in the pressure tap line as a backup or safety measure, but this valve is not necessary to the testing procedure.

It can also be seen that numerous modifications of the valve assembly, the system and the method of the first preferred embodiment described above may be made without departing from the spirit of the invention. For example, in the embodiment shown, the stinger is a separate removable part of the movable assembly. However, the movable assembly could be made in one piece, or the stinger could be designed with means for gripping the valve element. In such modifications the piston 102 and the provision of gas pressure to the cylinder 104 might be eliminated. In other modifications, the provision of gas to cylinder 104 might be replaced by the use of other biasing means such as springs.

In the form of the first embodiment of the invention shown, all fluids involved in the system are gases, and all inlets and outlets of the valve are in actual fluid communication with the bore 82 of the valve body. However, in other embodiments, the fluid from source 64 might be a liquid and/or diaphragms or the like might be associated with some of the inlets or outlets so that they are in pressure communicating relation but not fluid communication with the bore 82. Also in the form of the invention shown, all inlets and outlets except inlet 112 are stationary and are defined by bores through the valve body. However, the valve might be modified in various ways so that more of the inlets and/or outlets were incorporated in the movable assembly, or so that the inlet for the test pressure would be a stationary inlet.

Figure 10:
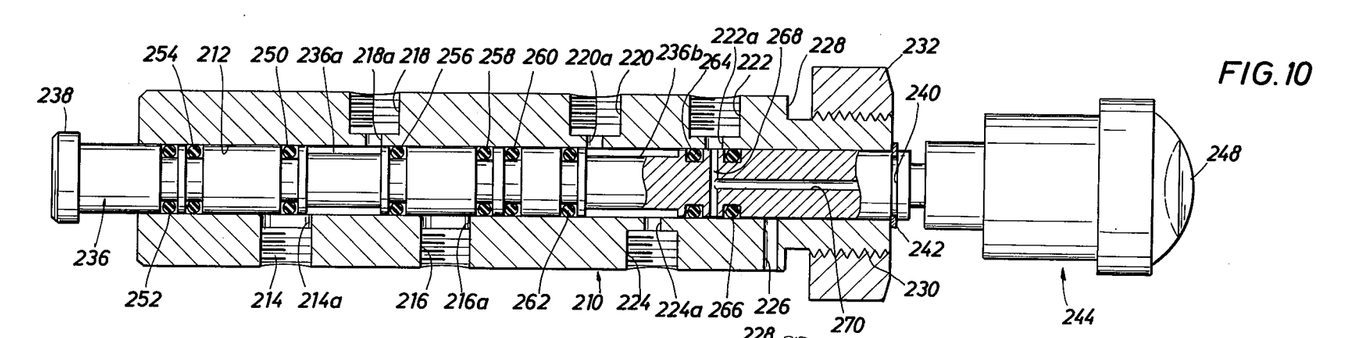
FIG. 10 is a longitudinal sectional view of another embodiment of the valve assembly according to the invention in a first position.
Figure 11:
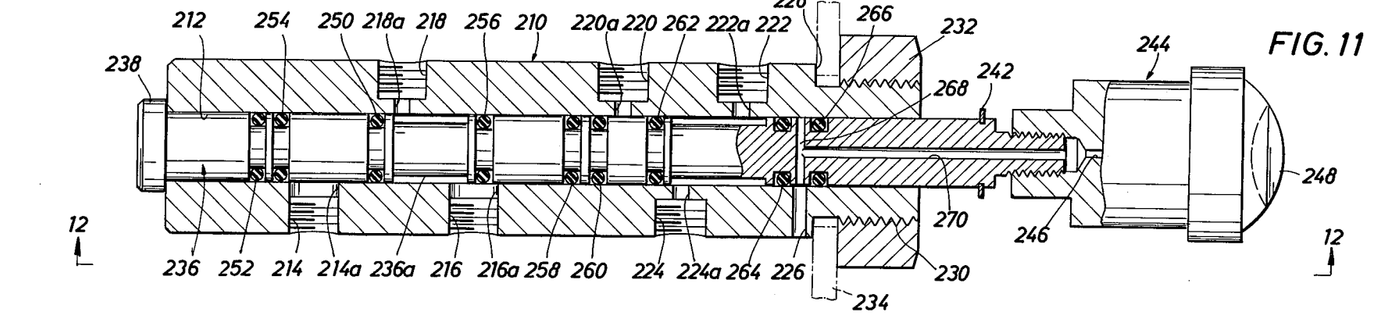
FIG. 11 is a view similar to FIG. 10 showing the assembly in a second position.
Figure 12:
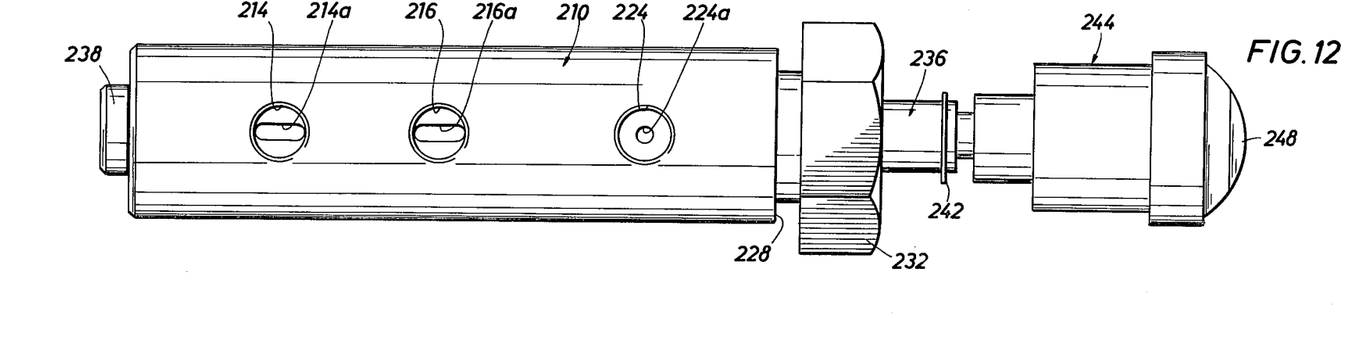
FIG. 12 is an elevational view taken on lines 12—12 of FIG. 11.

Referring now to FIGS. 10, 11 and 12, there is shown a second embodiment of the valve assembly of the present invention. The valve assembly includes a generally cylindrical valve body 210 having a hollow defined by a central longitudinal bore 212 therethrough. All of the inlets and outlets of the valve assembly are defined by bores extending radially through the valve body to the hollow 212. In particular, a threaded bore 214 has an unthreaded inner portion 214a communicating with hollow 212 and defining the first inlet of the valve assembly. Inlet 214a has a length or longitudinal extent substantially equal to the diameter of the threaded portion of bore 214. However, the width or circumferential extent of inlet 214a is substantially less than the diameter of the threaded portion of the bore 214, as best seen in FIG. 12.

A second threaded radial bore 216, longitudinally spaced from bore 214 (to the right as viewed in the drawing), has an inner portion 216a defining a second inlet for the valve assembly. Bore 216 is substantially identical to bore 214 in configuration, and in particular, inlet 216a has a length substantially equal to the diameter of the threaded portion of bore 216, but a width substantially less than said diameter.

Another threaded radial bore 218 disposed intermediate but diametrically across from bores 214 and 216 has an unthreaded inner portion 218a defining a first outlet for the valve assembly. The configuration of outlet 218a is that of a cylinder disposed at right angles to hollow tube 12. Its diameter, and thus both its longitudinal and circumferential extent with respect to hollow 212, is substantially less than that of the threaded portion of bore 218.

Another threaded radial bore 220 is longitudinally spaced to the right of bores 214, 216 and 218. Bore 220 is substantially identical in configuration to bore 218, and in particular, has an unthreaded inner portion 220a of reduced diameter defining a third inlet for the valve assembly. Longitudinally spaced to the right of bore 220 is a threaded radial bore 222 substantially identical to bores 218 and 220 and having an inner portion 222a defining a fourth inlet for the valve assembly. Finally, a threaded radial bore 224, located intermediate but diametrically across from bores 220 and 222, and substantially identical thereto, has a reduced inner portion 224a defining a second outlet for the valve assembly.

Valve body 210 also has an unthreaded vent port 226 extending radially thereinto to hollow 212 and longitudinally spaced to the right of each of the aforementioned threaded bores.

Valve body 210 includes an external reduced diameter section at one end thereof defining an external annular shoulder 228. The reduced diameter section is also externally threaded at 230 for receipt of a mounting nut 232. Thus the valve assembly may be mounted on a suitable support by clamping a flange 234 or the like between shoulder 228 and nut 232.

In order to incorporate the valve assembly into a system such as that shown in FIG. 2, the pressure tap line 56 is connected to bore 214. The test pressure source 74 is connected via a suitable line or the like to bore 216. Bore 218 may be connected, via a more or less conventional "T" fitting, to both of the lines 61 and 63 leading to respective control units 60 and 62. Alternatively, the valve body 210 might be provided with a seventh threaded bore extending radially thereinto but stopping short of bore 212. This seventh threaded bore would be connected to bore 218 by a suitable passageway. Then, such threaded bore might be connected to one of the lines 61 or 63, the other of the lines being connected to bore 218, as in the first embodiment of the invention. As still another alternative, the valve assembly of FIGS. 10–12 might be used in a system similar to that of FIG. 2, but having only one control unit. In such case, the control unit would simply be connected to bore 218. To complete the incorporation of the valve assembly into the system of FIG. 2, the signal line 66 would be connected to bore 220, the bypass line 68 would be connected to bore 222, and line 70 leading to valve actuator 54 would be connected to bore 224.

The valve assembly of FIGS. 10–12 further includes a spool-type valve element having a shaft portion 236 slidably mounted for reciprocation in hollow 212. The valve element further includes elastomeric seal rings 250, 252, 254, 256, 258, 260, 262, 264 and 266, to be described more fully below, carried in respective annular grooves at longitudinally spaced locations along shaft portion 236. The seal rings are sized to seal between shaft portion 236 and hollow 212 of valve body 210. Shaft 236 has end portions extending longitudinally outwardly from valve body 210. On the left-hand end portion there is rigidly mounted a stop nut 238 which is engageable with the adjacent end of valve body 210 to limit movement of the valve element to the right as viewed in the figures. The other end portion of shaft 236 has an external annular groove 240 for receipt of a snap ring 242 which is engageable with the adjacent end of valve body 210 to limit movement of the valve element to the left as viewed in the figures.

The latter end portion of shaft 236 extends longitudinally outwardly beyond snap ring 242 and is threadedly connected to an assembly 244. Assembly 244 is a pressure sensitive indicator and, secondarily, serves as a handle for operating the valve assembly. As shown, indicator 244 is of a type commercially available from the C. A. Norgren Co., Littleton, Colorado, under the tradename "Rotowink." Since the indicator per se is not a part of the present invention, it is not disclosed herein in full detail. Briefly, it includes a passageway 246 adjacent the end of valve element shaft 236 for communicating pressure to the interior of indicator 244 in a manner to be described more fully below. When such pressure is greater than or equal to a given magnitude, it operates upon an internal mechanism (not shown) which in turn rotates a ball 248, mounted in a socket in the outermost end of indicator 244, to a position such that a first portion of the ball is visible through the end of indicator 244. When the pressure in passageway 246 drops below the aforementioned given magnitude, the ball 248 rotates to another position in which a second portion thereof, of a different color from the first portion, is visible through the end of indicator 244. However, virtually any type of pressure sensitive indicator capable, upon communication therewith of pressure greater than or equal to a given magnitude, to provide a first indication, and upon communication therewith of pressure less than that magnitude, to provide a second indication may be used. The indications may be visible, audible or both. Furthermore, one of the two indications provided by the indicator might be a positive signal, such as an audible sound, and the other "indication" might simply be the absence of such signal.

Referring particularly to FIG. 10, the valve assembly is shown in a first position effected by pushing inwardly with assembly 244 to move the attached shaft 236 to the left to the full extent permitted by snap ring 242. Where the valve assembly is incorporated into a system such as that shown in FIG. 2, in the manner described hereinabove, the first position of FIG. 10 would be assumed during normal system operation, as opposed to testing. In the first position of FIG. 10, an O-ring 250 of a relatively soft elastomeric material, such as a natural or synthetic rubber, is disposed in alignment with first inlet 214a. O-ring 250 will be referred to as the first seal means of the valve assembly of FIGS. 10-12, since it controls the flow of fluid from the first inlet 214a. Since seal ring 250 has a length or longitudinal extent substantially less than that of inlet 214a, fluid may flow through inlet 214a when seal ring 250 is aligned therewith in the first or in-service position. In particular, fluid may flow through inlet 214a and axially along the clearance between valve body 210 and shaft 236 in hollow 212. Fluid flowing to the left is blocked by O-rings 252 and 254 from leaking out of the left-hand end of the valve body. Fluid flowing to the right is free to pass into outlet 218. Shaft 236 has a reduced diameter section 236a aligned with outlet 218a (in both valve positions) and located intermediate O-rings 250 and 256 to facilitate such flow.

O-ring 256, which is carried in a respective annular groove on shaft 236 is the second seal means of the valve assembly, and in the first position shown in FIG. 10, is disposed between first outlet 218a and second inlet 216a in sealing engagement with shaft 236 and valve body 210. Thus, seal ring 256 blocks inlet 216a from pressure communication with outlet 218a in the first or in-service position. O-rings 258 and 260 are carried by respective annular grooves on shaft 236 and are positioned to the right of inlet 216a (in both valve positions) to block fluid pressure communication from inlet 216a to inlets 220a and 222a and outlet 224a. Thus, with the valve element in its first position, fluid from the pressure tap 56, connected to inlet 214a, flows through said inlet to outlet 218a, connected to the line 61 and 63 leading to the control units. Meanwhile the test pressure 216a is isolated by O-rings 256, 258 and 260 from communication with any of the other inlets or outlets of the valve assembly.

A third seal means, in the form of O-ring 262 is, in the first position, disposed on the opposite side of third inlet 220a from second outlet 224a. Thus, fluid from the signal line 66 can flow through connected inlet 220a and hollow 212 to outlet 224a, and thus through the connected line 70 to valve actuator 54. To facilitate such flow, shaft 236 has a reduced diameter section 236b aligned with outlet 224a and, in the first position of FIG. 10, also aligned with inlet 220a. A fourth seal means in the form of O-ring 264 is disposed between outlet 224a and fourth inlet 222a in sealing engagement with shaft 236 and valve body 210 thereby blocking fluid pressure from the bypass line 68, connected to inlet 222a, from communication with any of the other inlets or outlets of the valve assembly. Finally, an O-ring 266 of the valve assembly is positioned to the right of inlet 222a to prevent fluid from leaking from said inlet out of the right-hand end of the valve body.

As mentioned above, O-rings 264 and 266 are disposed on opposite sides of inlet 222a when the valve element is in its first position and isolate inlet 222a from communication with any of the other inlets or outlets of the valve. Furthermore, O-ring 266 also blocks inlet 222a from pressure communication with vent 226. However, shaft 236 has a passageway 268 extending radially thereinto, and more particularly completely diametrically through shaft 236, between O-rings 264 and 266. Radial passageway 268 is aligned with inlet 222a when the valve element is in its first position. Shaft 236 also has a longitudinal passageway 270 extending from a radially inner portion of passageway 268 through the right-hand end of shaft 236 to passageway 246 of the indicator 244. Thus, the pressure of the bypass line 68, connected to inlet 222a, is communicated to indicator 244 via passageways 268, 270 and 246, while O-rings 264 and 266, which together serve as the indicator seal means of the valve assembly, isolate passageways 268, 270 and 246 from pressure communication with any of the other valve inlets or outlets as well as from pressure communication with vent 226.

Indicator 244 is chosen so that the pressure in the bypass line 68 will be greater than the controlling pressure magnitude for the indicator. Thus, the pressure communicated to the indicator 244 from inlet 222a when the valve element is in its first position is sufficient to activate indicator 244 to rotate ball 248 to a position presenting a first color portion of the ball for view as an indication that the system is in-service.

In order to test the control system associated with the valve assembly, handle 244 is pulled outwardly moving the adjoined valve element to the right until stop nut 238 abuts the valve body. This places the valve element in its second position as shown in FIG. 11. In this position seal rings 252 and 254 are still disposed to the left of inlet 214a in sealing engagement with the shaft portion 236 of the valve element and with the interior of the valve body 210. Thus, fluid pressure from inlet 214a is still prevented from leaking out through the left-hand end of valve body 210. However, first seal ring 250 is now disposed between inlet 214a and outlet 218a, in sealing engagement with shaft 236 and the interior of the valve body 210, thereby blocking pressure communication between inlet 214a and outlet 218a. Accordingly, inlet 214a is, in the second position, isolated from pressure communication with any of the other inlets or outlets of the valve assembly O-rings 252, 254 and 250.

Seal ring 256, on the other hand, is positioned in alignment with its respective inlet 216a in the second position. Since the longitudinal extent of the seal ring 256 is substantially less than that of inlet 216a, fluid may flow through inlet 216a along hollow 212 to outlet 218a. Thus, with the valve element in its second position, the control pressure in tap 56, connected to inlet 214a, is blocked from communication with control units 60 and 62, connected to outlet 218a. At the same time, the test pressure source 74, connected to inlet 216a, is in pressure communication with control units 60 and 62 via the connected outlet 218a. The control units can therefore be tested in the manner described hereinabove.

Referring again to FIG. 10 in conjunction with FIG. 11, it can be seen that the spacing between first seal ring 250 and the right-hand side of its respective inlet 214a and the spacing of second seal ring 256 from its respective inlet 216a in the first position are such that, as the valve element is moved from its first to its second position, seal ring 250 will attain sealing engagement with the valve body to the right of inlet 214a just prior to or substantially simultaneously with the movement of seal ring 256 into alignment with inlet 216a (and the consequent release of its sealing engagement with the valve body to the left of inlet 216a). Upon movement of the valve element from the second position to the first position, the reverse is true, i.e. seal ring 256 attains sealing engagement between inlet 216a and outlet 218a prior to or substantially simultaneously with the release of sealing engagement between outlet 218a and inlet 214a by seal ring 250. Thus, the valve assembly prevents substantial communication between inlets 214a and 216a, thereby preventing pressure back-ups and consequent malfunctioning of the apparatus.

Movement of the valve element to its second position also moves seal ring 262 across inlet 220a to a position intermediate that inlet and second outlet 224a. As in the first position, seal rings 258 and 260 are disposed between inlets 220a and inlet 216a. Thus, with the valve element in its second position, inlet 220a is isolated from communication with any of the other valve inlets or outlets. Movement of the valve element to its second position also moves fourth seal ring 264 across inlet 222a from outlet 224a. Thus, inlet 222a is placed in pressure communicating relation to outlet 224a. Such communication is facilitated by movement of reduced diameter section 236b of shaft 236 into alignment with inlet 222a, section 236b still being in alignment with outlet 224a. Accordingly, signal line 66, connected to inlet 220a, is, in the second position of the valve, blocked from pressure communicating relation with outlet 224a, connected via line 70 to valve actuator 54. At the same time, bypass line 68, connected to inlet 222a, has been placed in pressure communicating relation with the valve actuator 54 via line 70 and connected outlet 224a.

Seal rings 262 and 264 have effective sealing areas of slightly less longitudinal extent than their respective inlets 220a and 222a. Also, these seal rings are, in the first position, spaced from their respective inlets by distances such that, as the valve element is moved from its first to its second position, inlet 222a begins to communicate with outlet 224a prior to or substantially simultaneously with the blocking of communication between inlet 220a and outlet 224a. Thus, movement of the valve element from its first to its second position does not involve any interruption in the supply of pressure to valve actuator 54. The same is true when the valve element is moved from its second position back to its first position.

The second position of the valve element also brings passageway 268 into alignment with indicator vent 226 and positions indicator seal rings 264 and 266 on opposite sides of vent 226 in sealing engagement with the valve body. Thus, passageway 246 of indicator 244 is vented to atmosphere via passageways 270 and 268 and vent 226. Seal rings 264 and 266 also isolate passageway 268, and thus passageways 270 and 246, from communication with any of the valve inlets or outlets. Finally, seal rings 264 and 266 prevent leakage of fluid pressure from inlet 222a out through the right-hand end of valve body 210. The venting of the passageway 246, as described above, permits ball 248 to rotate to a position exposing a second color portion thereof and thereby providing a second indication showing that the valve is in its test position.

It can be seen from the foregoing discussion, that a single movement of the valve assembly of FIGS. 10-12 disconnects the control pressure in tap 56 from communication with the control unit 60 and 62, places the test pressure source 74 in communication with the control unit, disconnects the signal line 66 from communication with valve actuator 54, and connects bypass line 68 with valve actuator 54 by a single movement of the valve assembly. Furthermore, the indicator 244 is disconnected from communication with bypass inlets 222a and vented to atmosphere whereby it provides a definite indication that the valve assembly is in its test position. When it is desired to return the system to its in-service condition, this may be accomplished again by a single movement of the valve assembly. And again, indicator 244 provides a definite indication that the valve and system are, once again, in-service. Thus, use of the valve assembly of FIGS. 10-12 in a system such as that shown in FIG. 2, virtually eliminates any chance of an operator making some, but not all of the required connections and disconnections at the end of a test period. Furthermore, the use of indicator 244 helps to assure that the operator will not completely fail to make any of said connections and disconnections when testing is completed.

Additionally, the valve operates to provide selective communication between outlet 218a and the adjacent inlets 214a and 216a without the need for the respective seal rings 250 and 256 moving completely across said inlets nor across the intermediate outlet. This substantially reduces the danger of damage to the rings 250 and 256, even where the pressures at inlets 214a and 216a are relatively high, e.g. 5000 psi or greater. This in turn permits seal rings 250 and 256 to be made of a relatively soft elastomeric material which has good sealing properties for the type of apparatus involved.

As is the case with the first embodiment of the present invention, the second embodiment shown in FIGS. 10-12 can be modified in various ways without departing from the spirit of the invention. For example, the indicator 244 might be vented to atmosphere in the first position (rather than the second position) of the connected valve element, and communicated with one of the valve inlets in the second position. Furthermore, while the inlet which communicates with the indicator 244 is, in the embodiment shown, the bypass inlet 222a, any of the other valve inlets could also be used. The valve assembly of FIGS. 10–12 could also be modified to include some of the features of the first embodiment of the invention.

Numerous other modifications will suggest themselves to those skilled in the art. Accordingly, it is intended that the scope of the invention be limited only by the claims which follow.

I claim:
1. A valve assembly comprising:
a valve body having a hollow therein, said valve assembly having at least two longitudinally spaced inlets and at least one outlet in pressure communication relation to said hollow;
a valve element longitudinally movable within said hollow between first and second positions with respect to said valve body, said valve element blocking pressure communication between said one of said inlets and said one outlet and permitting pressure communication between the other of said inlets and said one outlet via said hollow in said first position, and permitting pressure communication between said one inlet and said one outlet via said hollow and blocking pressure communication between said other inlet and said one outlet in said second position;
pressure sensitive indicator means operatively associated with said valve element and operative upon communication therewith of pressure greater than or equal to a given magnitude to provide a first indication and upon communication therewith of pressure less than said magnitude to provide a second indication;
means providing pressure communication between said one inlet and said indicator means when said valve element is in said first position;
and means blocking pressure communication between said one inlet and said indicator means when said valve element is in said second position.

2. A valve assembly according to claim 1 wherein said inlets and said one outlet are defined by bores extending generally laterally into said valve body to said hollow.

3. A valve assembly according to claim 2 wherein said means providing communication between said one inlet and said indicator means comprises passageway means at least partially defined by said valve element, and wherein said means blocking communication between said one inlet and said indicator means comprises indicator seal means on said valve element for sealing engagement between said valve element and said valve body.

4. A valve assembly according to claim 3 wherein said indicator means is adjoined to said valve element externally of said valve body, and wherein said passageway means includes a radial passageway extending radially into said valve element from a radially inner portion of said radial passageway to said indicator means.

5. A valve assembly according to claim 4 wherein said valve body has an indicator vent therethrough communicating with said hollow in longitudinally spaced relation from said one inlet, said indicator vent being positioned for pressure communication with said radial passageway when said valve element is in said second position, and wherein said indicator seal means is further operative to block said indicator vent from connunication with said radial passageway when said valve element is in said first position.

6. A valve assembly according to claim 5 wherein said indicator seal means comprises a pair of annular seal rings surrounding said valve element on opposite sides of said radial passageway, and wherein said radial passageway is generally aligned with said one inlet when said valve element is in said first position and generally aligned with said indicator vent when said valve element is in said second position.

7. A valve assembly according to claim 6 wherein said one outlet is disposed longitudinally intermediate said inlets.

8. A valve assembly according to claim 7 wherein said one inlet comprises the fourth inlet of said valve assembly, said other inlet comprises the third inlet of said valve assembly, and said one outlet comprises the second outlet of said valve assembly, and wherein said valve assembly further comprises first and second inlets and a first outlet in pressure communicating relation to said hollow, said valve element further being operative to permit pressure communication between said first inlet and said first outlet via said hollow and block pressure communication between said second inlet and said first outlet in said first position, and to permit pressure communication between said second inlet and said first outlet via said hollow and block pressure communication between said first inlet and said first outlet in said second position.

9. A valve assembly according to claim 8 wherein said first and second inlets are defined by the radially inner portions of a pair of longitudinally spaced apart bores extending into said valve body to said hollow, the extent of each of said first and second inlets longitudinally of said hollow being substantially greater than its extent circumferentially of said hollow; wherein said first outlet is defined by a bore extending generally laterally into said valve body intermediate said first and second inlets; wherein said valve element comprises first seal means aligned with said first inlet in said first position and disposed intermediate said first inlet and said first outlet in said second position, and second seal means disposed intermediate said first outlet and said second inlet in said first position and aligned with said second inlet in said second position; and wherein said first inlet is substantially greater than said first seal means in extent, longitudinally of said hollow and said second inlet is substantially greater than said second seal means in extent longitudinally of said hollow.

10. A valve assembly according to claim 9 wherein said valve element further comprises third and fourth seal means disposed on opposite sides of said second outlet in both of said first and second positions, said fourth seal means being disposed intermediate said second outlet and said fourth inlet in said first position, and said third seal means being disposed intermediate said third inlet and said second outlet in said second position.

11. A valve assembly according to claim 10 wherein said third seal means is disposed across said third inlet from said second outlet in said first position and said fourth seal means is disposed across said fourth inlet from said second outlet in said second position.

12. A valve assembly comprising:
a valve body having a hollow therein, and further having a pair of longitudinally spaced bores extending generally laterally into said valve body, said bores having radially inner portions intersecting said hollow and defining first and second inlets respectively, the extent of each of said inlets longitudinally of said hollow being substantially greater than its extent circumferentially of said hollow, said valve body further having a first outlet defined by another bore extending generally laterally into said valve body to said hollow intermediate said first and second inlets;

a valve element longitudinally movable within said hollow between first and second positions with respect to said valve body, and comprising a first seal means aligned with said first inlet in said first position and disposed intermediate said first inlet and said first outlet in said second position, and second seal means disposed intermediate said first outlet and said second inlet in said first position and aligned with said second inlet in said second position, said first seal means being substantially less than said first inlet in extent longitudinally of said hollow, and said second seal means being substantially less than said second inlet in extent longitudinally of said hollow, whereby said valve element is operative in said first position to permit pressure communication between said first inlet and said first outlet via said hollow and block pressure communication between said first outlet and said second inlet, and operative in said second position to permit pressure communication between said second inlet and said first outlet via said hollow and block pressure communication between said first inlet and said first outlet.

13. A valve assembly according to claim 12 wherein said valve body further has third and fourth inlets defined by longitudinally spaced extending generally laterally into said valve body to said hollow and a second outlet defined by a bore extending generally laterally into said valve body to said hollow intermediate said third and fourth inlets, and wherein said valve elements is further operative in said first position to permit pressure communication between said third inlet and said second outlet via said hollow and block pressure communication between said fourth inlet and said second outlet, and operative in said second position to permit pressure communication between said fourth inlet and said second outlet via said hollow and block pressure communication between said third inlet and said second outlet.

14. A valve assembly according to claim 13 wherein said valve element further comprises third and fourth seal means disposed on opposite sides of said second outlet in both of said first and second positions, said fourth seal means being disposed intermediate said second outlet and said fourth inlet in said first position, and said third seal means being disposed intermediate said third inlet and said second outlet in said second position.

15. A valve assembly according to claim 14 wherein said third seal means is disposed across said third inlet from said second outlet in said first position, and wherein said fourth seal means is disposed across said fourth inlet from said second outlet in said second position.

16. A valve assembly according to claim 9 wherein said hollow is generally cylindrical and has a substantially constant radius of curvature throughout the section thereof intersected by said first and second inlets and said first outlet.

17. A valve assembly according to claim 12 wherein said hollow is generally cylindrical and has a substantially constant radius of curvature throughout the section thereof intersected by said first and second inlets and said first outlet.

* * * * *

UNITED STATES PATENT AND TRADEMARK OFFICE
CERTIFICATE OF CORRECTION

PATENT NO. : 4,188,974
DATED : February 19, 1980
INVENTOR(S) : Harry Roger

It is certified that error appears in the above-identified patent and that said Letters Patent are hereby corrected as shown below:

In Claim 13, Column 19, line 33, after the word "spaced," insert --bores--.

Signed and Sealed this

Sixteenth Day of June 1981

[SEAL]

Attest:

RENE D. TEGTMEYER

Attesting Officer

Acting Commissioner of Patents and Trademarks